United States Patent [19]

Fife et al.

[11] Patent Number: 4,534,221
[45] Date of Patent: Aug. 13, 1985

[54] ULTRASONIC DIAGNOSTIC IMAGING SYSTEMS FOR VARYING DEPTHS OF FIELD

[75] Inventors: Michael J. Fife, Denver; Paul T. Diaz, Englewood; Dennis R. Dietz, Littleton, all of Colo.

[73] Assignee: Technicare Corporation, Solon, Ohio

[21] Appl. No.: 451,313

[22] Filed: Dec. 20, 1982

[30] Foreign Application Priority Data

Sep. 27, 1982 [GB] United Kingdom ................. 8227532

[51] Int. Cl.³ ........................................... G01N 29/00
[52] U.S. Cl. ...................................... 73/626; 73/625; 73/642; 73/599; 128/660
[58] Field of Search .................. 73/626, 642, 599; 128/660

[56] References Cited

U.S. PATENT DOCUMENTS

| | | | |
|---|---|---|---|
| 3,815,409 | 6/1974 | Macovski | 73/642 |
| 3,898,840 | 8/1975 | McElroy | 73/642 |
| 3,924,454 | 12/1975 | McElroy | 73/642 |
| 4,016,750 | 4/1977 | Green | 73/599 |
| 4,016,751 | 4/1977 | Kossoff | 73/626 |
| 4,034,332 | 7/1977 | Alais | 340/9 |
| 4,058,003 | 11/1977 | Macovski | 73/626 |
| 4,137,777 | 2/1979 | Haverl | 73/642 |
| 4,138,895 | 2/1979 | Mezrich | 73/642 |
| 4,155,259 | 5/1979 | Engeler | 73/626 |
| 4,159,462 | 6/1979 | Rocha et al. | 73/626 |
| 4,180,790 | 12/1979 | Thomas | 73/626 |
| 4,212,206 | 7/1980 | Hartemann et al. | 73/626 |
| 4,241,611 | 12/1980 | Specht et al. | 73/626 |
| 4,242,911 | 1/1981 | Martin | 73/626 |
| 4,290,310 | 9/1981 | Anderson | 73/626 |
| 4,307,613 | 12/1981 | Fox | 73/626 |
| 4,353,123 | 10/1982 | Rost | 367/137 |
| 4,413,520 | 11/1983 | Murakami et al. | 73/628 |
| 4,434,661 | 3/1984 | Miwa et al. | 73/625 |
| 4,442,713 | 4/1984 | Wilson et al. | 73/626 |
| 4,442,715 | 4/1984 | Brisken et al. | 73/626 |
| 4,446,740 | 5/1984 | Wilson et al. | 73/626 |
| 4,459,853 | 7/1984 | Miwa et al. | 73/626 |
| 4,470,305 | 9/1984 | O'Donnell | 73/626 |

Primary Examiner—Howard A. Birmiel
Attorney, Agent, or Firm—W. Brinton Yorks, Jr.

[57] ABSTRACT

An ultrasonic diagnostic imaging system is described in which a multi-element transducer array transmits a focused beam of energy from the transducer elements. As the depth of focus is varied between near and far field focusing under operator control, the nominal frequency of the transmitted ultrasound energy is varied correspondingly by the system, from relatively high frequency transmission in the near field to relatively low frequency transmission in the far field.

13 Claims, 6 Drawing Figures

ULTRASONIC DIAGNOSTIC IMAGING SYSTEMS FOR VARYING DEPTHS OF FIELD

This invention relates to the non-invasive examination of soft tissue and body organs and, in particular, to medical ultrasonic pulse-echo systems for imaging tissue at varying depths in the body.

Ultrasonic diagnostic instruments operate on either a pulse-echo or Doppler principle. The pulse-echo principle is used primarily for the imaging of soft body tissue, and involves the transmission of short bursts of ultrasonic energy into the tissue and the measurement of echoes received from tissue interfaces. The echo measurements are recorded and used to create an image of the tissue which reflected the echoes.

The ultrasonic energy used for imaging is produced by a transducer, which converts electrical energy into acoustic energy for transmission into the tissue being imaged. The transducer may also serve the second function of receiving the reflected echoes. The transducer is typically comprised of a piezoelectric ceramic material which is pulsed to transmit acoustic energy, and which detects received echoes by developing electrical signals in response thereto. The ceramic material may be a single crystal, or may be segmented into an array of elements of various shapes, such as linear and annular arrays.

In order to create a sharply defined tissue image of high resolution and to be able to examine tissue at various depths of field, it is desirable to be able to variably focus the beam of ultrasonic energy which is directed to the tissue, and to focus the echo energy returned from the tissue. In an array-type transducer, this is accomplished by sending time-coordinated bursts of energy from the various elements and by passing the received echoes from different elements through time delays of differing lengths before summing the received signals. Typically, a transmitted beam is directed to one particular range of tissue depths, but echoes may be received from a variety of depths outside the range, and thus the transducer should desirably be dynamically focussed as these echoes return.

The transmitted acoustic energy and returning echoes will undergo attentuation as the ultrasound passes through the tissue. As the depth of field increases and the round trip from the transducer and back again becomes longer, the received echoes will exhibit increasing attenuation. Accordingly, this attenuation is generally compensated for by increasing the gain of the receiver electronics as increasingly more distant echoes are received. This technique of dynamically increasing gain is referred to as time gain control (TGC).

Human tissue is responsible for a further phenomenon during ultrasonic examination. That is the propensity of lower frequency signals to travel through tissue with lesser attenuation than higher frequency signals. In accordance with the principles of the present invention, this phenomenon is advantageously exploited by focussing beams of high frequency acoustic energy in the near field. As the depth of focus is increased from near field focussing to far field focussing under operator control, the frequency of the transmitted ultrasonic energy is automatically reduced correspondingly. Thus, not only is the ultrasonic beam focussed at a desired tissue depth, but the beam is also of appropriate frequency for the selected depth, thereby providing an advantageous compromise of high resolution and good signal-to-noise ratio in the received echoes and resultant tissue image.

Figure 1:
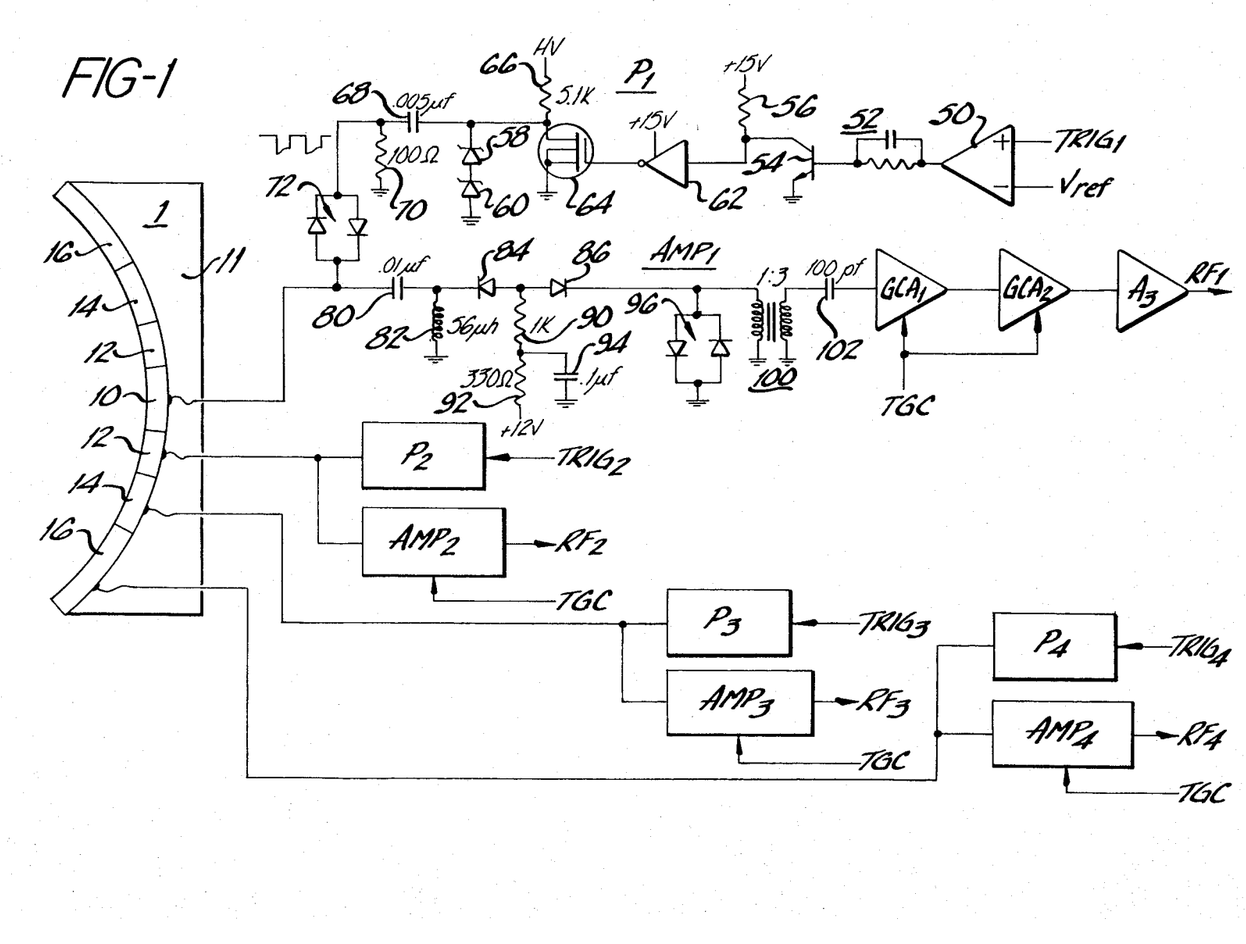
FIG. 1 illustrates, partially in block diagram form and partially in schematic diagram form, an annular array transducer with transmitting and receiving circuitry.

Referring to FIG. 1, an annular array transducer 1 is shown connected to its associated transmit and receive circuitry. The transducer 1 is shown in cross-section, and comprises a hemispherical surface of piezoelectric material mounted on a backing 11. The piezoelectric material is divided into a central disc 10, which is surrounded by three rings 12, 14, and 16. Each piezoelectric ring is connected to a respective transmitting circuit, or pulser $P_1$–$P_4$, and to respective receiving circuits $Amp_1$–$Amp_4$. Pulser $P_1$ and receiver $Amp_1$ are shown in schematic detail. Pulsers $P_2$–$P_4$ and receivers $Amp_2$ through $Amp_4$ are shown in block diagram form but are constructed in the same manner as pulser $P_1$ and receiver $Amp_1$.

Pulser $P_1$ receives an excitation signal, labeled $TRIG_1$. The $TRIG_1$ signal is applied to one input of a comparator 50, which compares the signal voltage level to a reference voltage, V ref. When the $TRIG_1$ signal exceeds the V ref voltage, the comparator 50 produces an output signal. The comparator 50 also serves to electrically isolate the pulser ground level reference voltage from ground level reference voltage of preceding circuitry. The output of the comparator is coupled to the base of a transistor 54 by an R-C network 52. The emitter of transistor 54 is coupled to ground, and its collector is connected to a current source resistor 56. The collector output of the transistor 54 is coupled to the input of a power driver 62. The power driver 62 converts the applied signal to a fifteen volt signal which is applied to the gate of a power FET 64. The source of FET 64 is connected to ground, and its drain is connected to a storage capacitor 68, over voltage protection zener diodes 58 and 60, and a resistor 66. Current is conducted by resistor 66 from a high voltage source (HV) to charge the capacitor 68 when the FET 64 is not conducting. The voltage source HV will have a typical range of 100 to 320 volts DC. When the FET is pulsed by a TRIG signal, the FET turns on, discharging the capacitor 68 into the center ring 10 of the transducer 1 by way of parallel coupled isolation diodes 72. The connecting line to the transducer ring may also include matching series or parallel chokes, as appropriate for the particular transducer.

Echo information signals received by the center ring 10 of the transducer 1 are applied to the receiver $AMP_1$ by a coupling capacitor 80 and a shunt choke 82. The junction of capacitor 80 and choke 82 is connected to series blocking diodes 84 and 86, which protect the receiver from high voltage pulses developed by pulser $P_1$. A biasing network including series connected resistors 90 and 92 is coupled between the joined anodes of diodes 84 and 86 and a +12 volt supply. A capacitor 94 is coupled between the junction of resistors 90 and 92 and ground. The cathode of diode 86 is connected to the input winding of a 1:3 step-up transformer 100, and shunt clamping diodes 96 are connected between the cathode of diode 86 and ground. The secondary winding of transformer 100 is connected by way of a coupling capacitor 102 to the input of a gain controlled amplifier, $GCA_1$. The output of amplifier $GCA_1$ is coupled to the input of a second gain controlled amplifier $GCA_2$. Each of these gain controlled amplifiers has a range of −15 db to +15 db which is controlled by a time gain control signal TGC. Thus, the gain of these two amplifiers may be varied from −30 db to +30 db as echo signals of decreasing strength are received in response to a transmitted ultrasonic pulse. The output of amplifier $GCA_2$ is coupled to the input of an amplifier $A_3$, which provides an additional 30 db of gain. Amplifier $A_3$ produces an output signal identified as $RF_1$.

In a similar manner, excitation signals $TRIG_2$, $TRIG_3$ and $TRIG_4$ activate pulsers $P_2$, $P_3$, and $P_4$ for the transmission of ultrasonic energy by respective rings 12, 14 and 16 of the annular array transducer 1. Echo signals received by these rings are applied to respective receivers $Amp_2$, $Amp_3$, and $Amp_4$ to produce respective output signals $RF_2$, $RF_3$, and $RF_4$.

Figure 2:
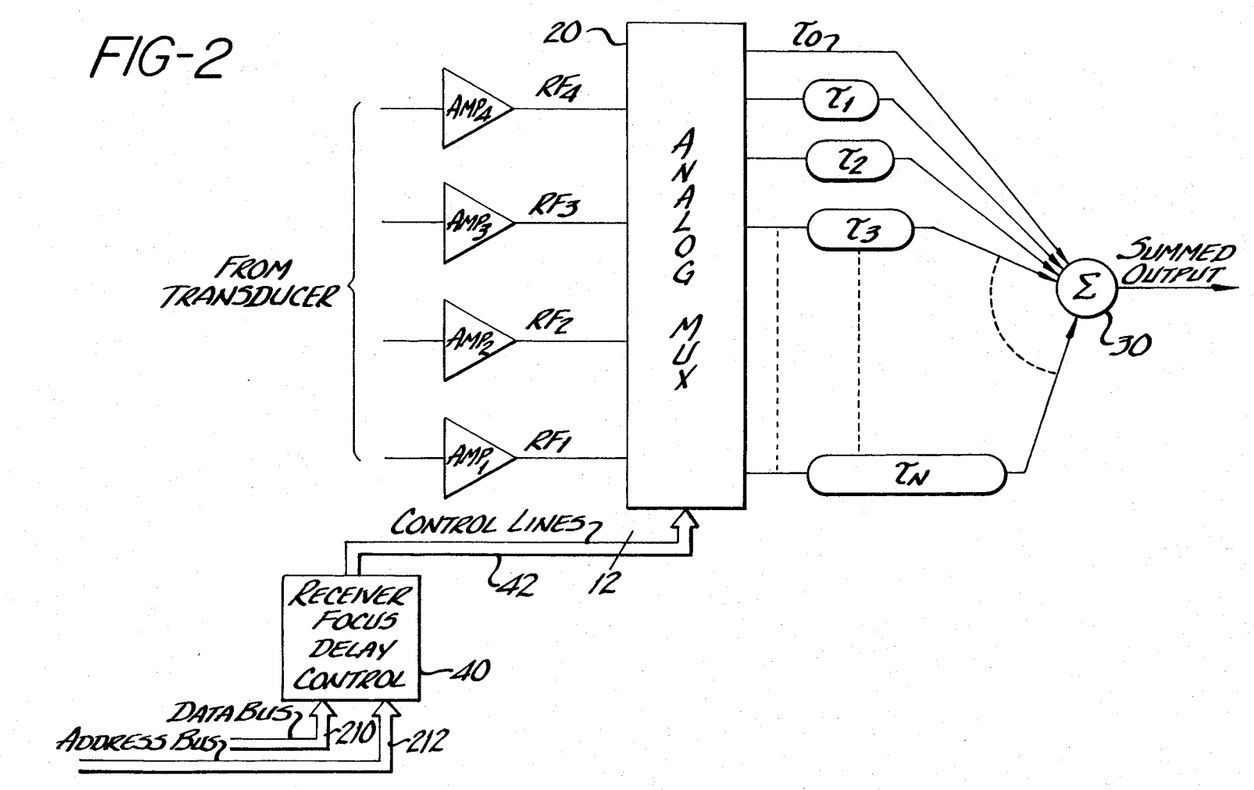
FIG. 2 illustrates, in block diagram form, an arrangement for dynamically focussing the ultrasonic echo information received by the arrangement of FIG. 1.

A system for dynamically focussing the received echo signals $RF_1$–$RF_4$ is shown in FIG. 2. The received echo signals are applied to an analog multiplexer 20, which steers the appropriate echo signals to a plurality of signal paths including delay lines $\tau_1$–$\tau_n$ or through a signal path $\tau_o$ containing no delay element. By properly delaying the echo signals as they are continuously received, echoes from a particular point in the tissue being imaged arrive simultaneously at a summing network 30. In the summing network 30, the signals are combined to produce a composite focussed echo signal at an output. The summed signal is then available for log compression and video conversion, then digitization and image display.

The analog multiplexer 20 is controlled by control signals generated in a receiver focus delay control system 40, and applied to the multiplexer 20 by way of control lines 42. The receiver focus delay control 40 is in turn controlled by information provided on a data bus 210 and an address bus 212, to be described further in conjunction with FIG. 3.

Figure 3:
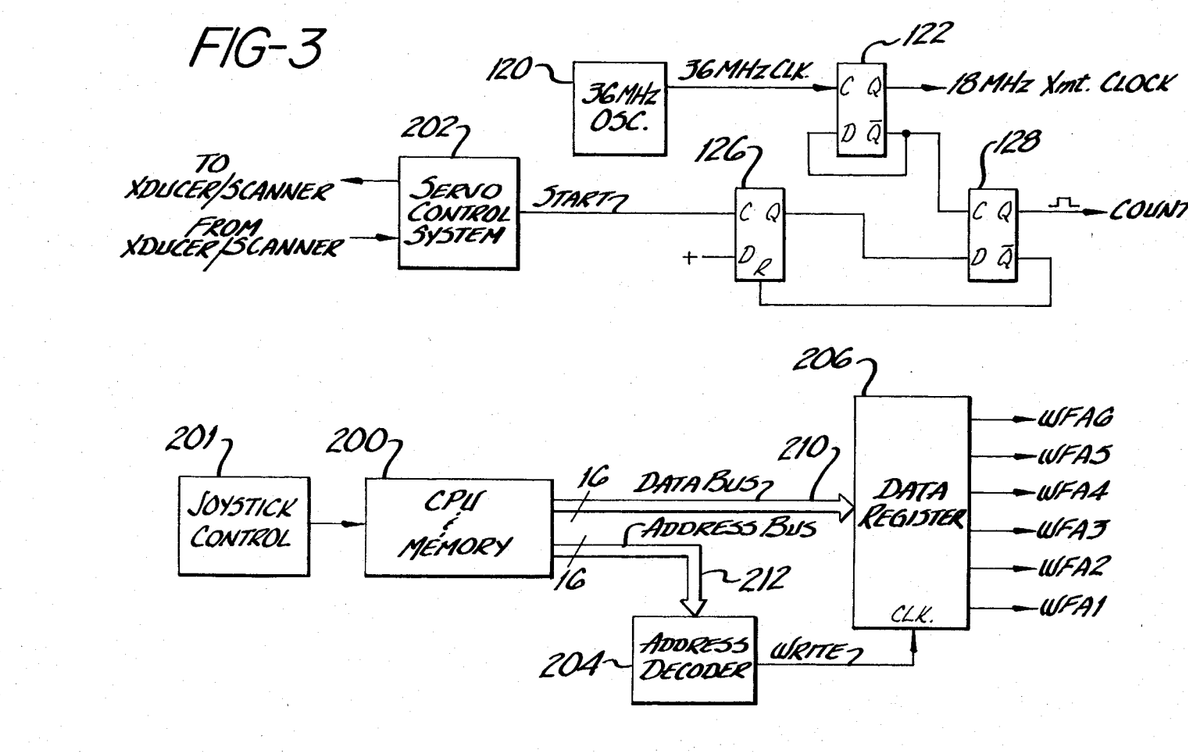
FIG. 3 illustrates, in block diagram form, an aarrangement for producing transmit control signals constructed in accordance with the principles of the present invention.

FIG. 3 shows a portion of an arrangement for controlling ultrasonic transmission and reception in accordance with the principles of the present invention. When the transducer 1 of FIG. 1 is used in a sector scanner, it is desirable to oscillate the transmitted and received ultrasound beams through a plane of tissue. This mechanical oscillation is performed under control of a servocontrol system 202 which controls apparatus to mechanically oscillate the transducer or a beam reflector such as a mirror. The servocontrol system 202 sends signals to the oscillating apparatus to control the beam motion, and receives feedback signals from the apparatus which are indicative of beam location.

When the transducer or mirror is oriented to properly direct the beam, the servo control system generates a START pulse, which is applied to the clock input C of a data-type flip-flop 126. The data input D of flip-flop 126 is coupled to a logical one source of supply voltage. The flip-flop 126 is set by the START signal, causing its Q output to go high which applies a high signal to the D input of a second data-type flip-flop 128. A 36 megahertz oscillator 120 generates a continuous 36 megahertz clock signal, which is applied to the C input of a further data-type flip-flop 122. Flip-flop 122 divides the 36 megahertz clock signal by two to produce an 18 megahertz XMT clock signal at its $\overline{Q}$ output by reason of the coupling of its $\overline{Q}$ output to its D input. The $\overline{Q}$ output of flip-flop 122 is coupled to the C input of flip-flop 128 to set flip-flop 128 in synchronism with the 18 megahertz XMT clock signal. The Q output of flip-flop 128 produces a one cycle COUNT signal. The $\overline{Q}$ output of flip-flop 128 is connected to the reset input R of flip-flop 126 to reset flip-flop 126 when the COUNT signal is generated, which drops the high signal at the D input of flip-flop 128 and terminates the COUNT signal on the next clock cycle.

When the scanning system is initially powered up, the CPU and memory unit 200 places data and address information on the data bus 210 and the address bus 212 for the receiver focus delay control 40. This information is tailored specifically for the particular transducer then in use in the system. In response to a depth of focus signal from an operator-controlled joystick control 201, the CPU and memory unit 200 also places transmit control information on the address and data buses. This information is changed whenever the operator adjusts the joystick control for a significantly different depth of focus. For transmit control, the data bus 210 is connected to a data register 206. The address bus 212 is coupled to an address decoder 204, which responds to the address information by producing a WRITE signal at its output. The WRITE signal clocks the data in the data register 206, which then holds six waveform control bits WFA1–WFA6.

Figure 4:
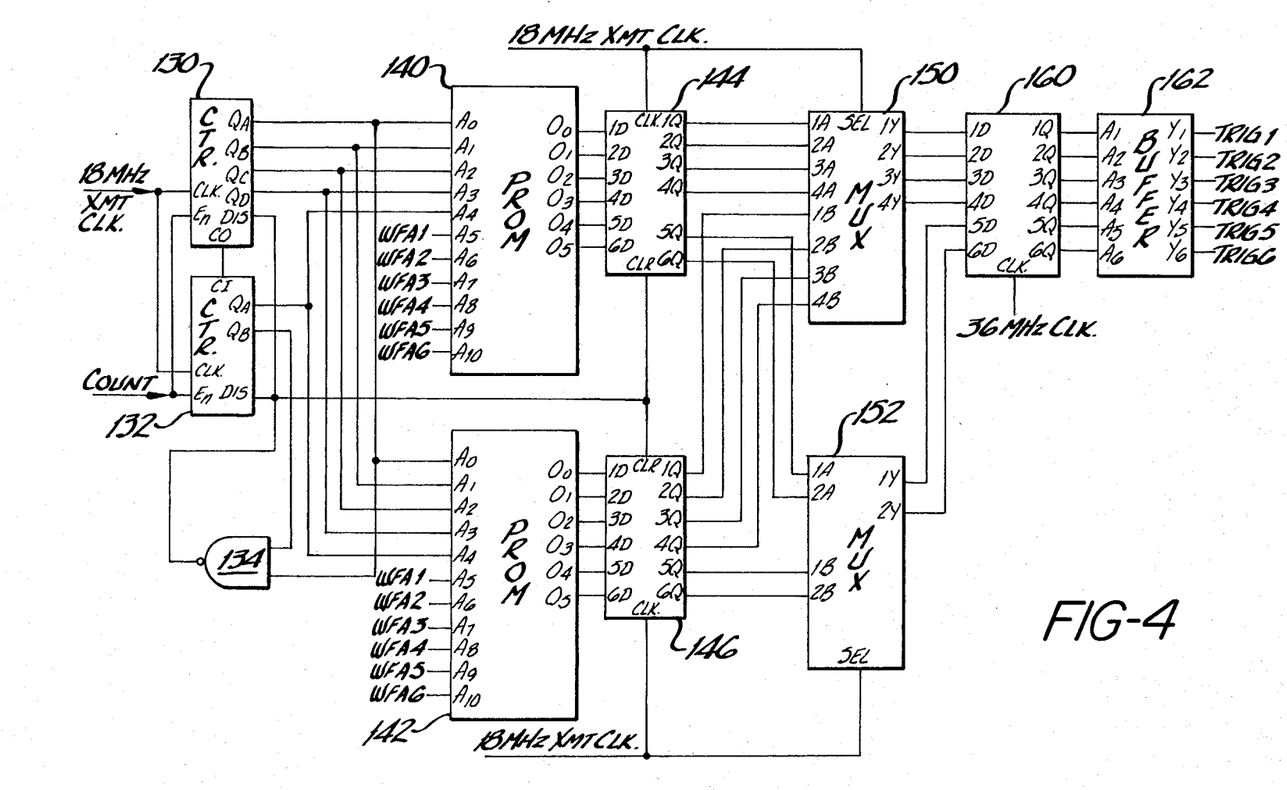
FIG. 4 illustrates, in block diagram form, an arrangement for producing transducer excitation signals for the arrangement of FIG. 1 in accordance with the principles of the present invention.

The data and control signals generated in the arrangement of FIG. 3 are applied to the transmit control arrangement shown in FIG. 4. The 18 megahertz XMT clock signal is applied to the clock inputs of counters 130 and 132, latches 144 and 146, and the select inputs of multiplexers 150 and 152. The 36 megahertz clock signal is applied to the clock input of a latch 160. The waveform address bits WFA1–WFA6 are applied to address inputs of programmable read only memories (PROM) 140 and 142 to address selected blocks of memory locations in the PROM's. Using six waveform address bits, 64 different blocks of memory locations, and hence 64 different transmit sequences, may be accessed.

With the waveform address bits WFA1–WFA6 addressing a selected block of PROM memory, the COUNT signal is applied to enable inputs of counters 130 and 132. The COUNT signal effectively loads zero counts into the counters which then begin counting in response to the 18 megahertz XMT clock signal. The counters 130 and 132 are cascaded by a carry out signal from counter 130 into the carry in input of counter 132 to permit the counters to count up from 1 to 32. At the count of 33, logically high signals are present on outputs $Q_A$ of counter 130 and $Q_B$ of counter 132, which are applied to inputs of a NAND gate 134. At the count of 33, the NAND gate 134 is enabled and produces a low signal which is applied to the disable inputs of the counters 130 and 132. The counters 130 and 132 are thus disabled at this point. As the counters are counting, their Q outputs, which are coupled to further address inputs of PROM's 140 and 142, sequentially address 32 memory locations in the selected block of memory locations. Thus, the outputs of the PROM's will produce words from 32 memory locations at an 18 megahertz rate.

Each PROM output word is latched into latches 144 and 146 by the 18 megahertz XMT clock. The outputs of latches 144 and 146 are coupled to inputs of multiplexers 150 and 152, which alternatively select output words from latches 144 and 146 and hence data from the PROM's. During one half cycle of the 18 megahertz XMT clock, for instance, the multiplexers 150 and 152 couple the output word from latch 144 to their outputs. During the next half cycle of the 18 megahertz XMT clock, the output word stored by latch 146 is coupled to the outputs of the multiplexers 150, 152. In this way the 18 megahertz rate of the PROM data is increased to a 36 megahertz rate.

The six outputs of multiplexers 150 and 152 produce separate output signals for six elements or rings of a transducer. The six signals are clocked into a latch 160 by the 36 megahertz clock to produce six output signals which are variable each at a 36 megahertz rate. The six output signals are applied to a buffer 162, which may also provide level translation of the signals to thereby produce six signals $TRIG_1$–$TRIG_6$ for the pulsers of FIG. 1. Since only a four ring transducer 1 is shown in FIG. 1, only signals $TRIG_1$–$TRIG_4$ are required for the embodiment of FIG. 1.

The hemispherically-shaped face of the annular array transducer 1 of FIG. 1 causes the transducer 1 to exhibit a given geometric focus. That is, when all of the rings of the transducer 1 are excited simultaneously, ultrasonic waves will propagate from the transducer rings and will arrive at the geometric focus point simultaneously. For example, a 19 mm annular array transducer 1 may have a geometric focus point located approximately 10 centimeters from the center ring 10.

Figure 5:
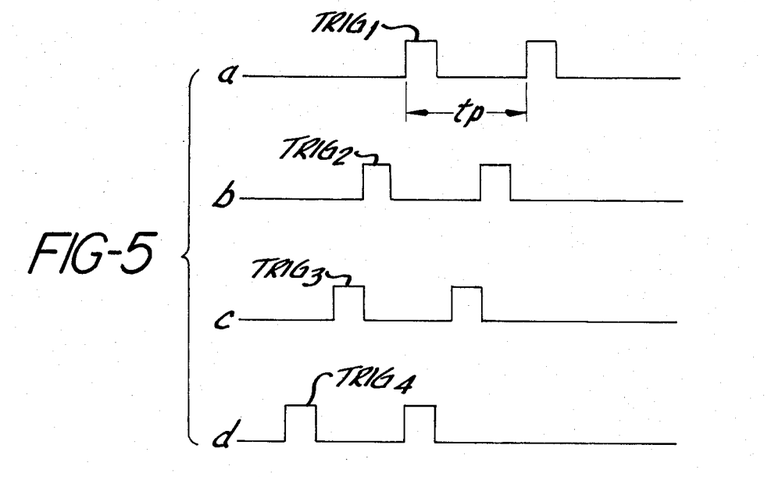
FIGS. 5 and 6 illustrate waveforms depicting the operation of the arrangements of FIGS. 1, 3, and 4.

The TRIG signals produced by the arrangement of FIG. 4 and applied to the pulsers $P_1$–$P_4$ of FIG. 1 will cause the transmitted ultrasonic waves to be focussed at points beyond or before the geometric focus point in accordance with the timing of the excitation signals. In a typical sequence of operation, the transmitted signals will first be focussed at short focal distances, and the transmit focus will then be changed to focus the ultrasonic energy at increasing depths in the tissue being imaged. When it is desired to focus the energy at a short depth, such as 4 centimeters, the arrangement of FIG. 4 will produce TRIG signals as shown in FIG. 5, all referenced to the same horizontal time axis. Since the distance from the outer rings of the transducer 1 to a focal point short of the geometric focus point are greater than the distance from the center ring to the short focus point, the outer rings 16, 14, 12 will be excited prior to center ring 10.

Each pulser in FIG. 1 is activated by a two-pulse TRIG signal sequence as shown in FIG. 5. Signal $TRIG_4$ activates pulser $P_4$ to excite the outer ring 16 first (FIG. 5d). Approximately 80 nanoseconds later, signal $TRIG_3$ activates pulser $P_3$, which excites ring 14 (FIG. 5c). Approximately 45 nanoseconds later, signal $TRIG_2$ activates pulser $P_2$ to excite ring 12 (FIG. 5b). Finally, approximately 75 nanoseconds later, signal $TRIG_1$ activates pulser $P_1$ to excite the center ring 10 (FIG. 5a). In this manner, the TRIG signals shown in FIG. 5 cause the transmitted ultrasonic waves to be focussed at approximately 4 centimeters from the center ring 10.

In accordance with the principles of the present invention, the TRIG signals also control the frequency of the transmitted ultrasonic waves. In FIG. 5, each pulse has a duration of approximately 50 nanoseconds, and the period between each pair of pulses, shown as $t_p$, is approximately 200 nanoseconds. The 200 nanosecond period between pulses causes the transmitted ultrasonic energy to have a center frequency of approximately 5 megahertz, a relatively high frequency. The relatively high frequency is desirable for near field focussing, since attenuation of the 5 megahertz signal is relatively small over the short distance and relatively high resolution images result from the high frequency signal.

Figure 6:
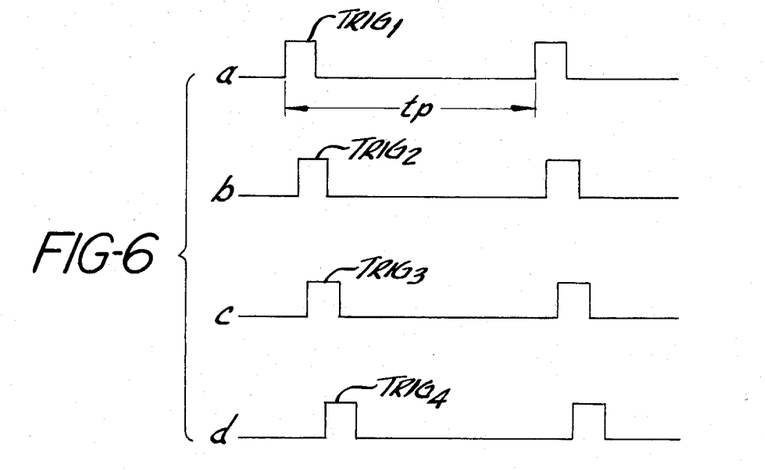

As the focal distance of the transducer is changed by the operator, the frequency of the transmitted signal is also changed correspondingly for improved attenuation characteristics at these different focal depths. Referring to FIG. 6, TRIG signal waveforms for imaging at approximately 12 centimeters are shown. Since 12 centimeters is beyond the geometric focus of the transducer, the distance from the outer rings of the transducer to the 12 centimeter focal point are shorter than the distance from the center ring to the 12 centimeter focal point. Accordingly, the center ring 10 will be excited prior to excitation of the outer rings so that the propagated waves will arrive at the 12 centimeter focal point concurrently. In FIG. 6a, signal $TRIG_1$ activates pulser $P_1$ to excite the center transducer ring 10. Approximately 20 nanoseconds later, signal $TRIG_2$ activates pulser $P_2$, which excites outer ring 12 (FIG. 6b). Signal $TRIG_3$ activates pulser $P_3$ 20 nanoseconds later (FIG. 6c), and signal $TRIG_4$ activates pulser $P_4$ approximately 30 nanoseconds later (FIG. 6d) to excite the outer rings 14 and 16 at these later times, respectively.

Since the transmitted signal is focussed at the relatively greater depth of 12 centimeters, a lower transmitted ultrasonic frequency is desired to reduce the effects of attenuation. The lower transmitted frequency is provided by the increased periodicity of the pulse pairs of FIG. 6 relative to those of FIG. 5. In FIG. 6, the period $t_p$ between pulses in each of the pulse pairs is approximately 420 nanoseconds, which causes the transmitted ultrasonic energy to exhibit a center frequency of approximately 2.4 megahertz.

Discrete focal points and corresponding frequency ranges of operation are shown for 3.5 megahertz and 5 megahertz transducers in Table I. TRIG signals for each of these focal points are stored in separate memory block locations in PROM's 140 and 142 of FIG. 4. The nominal 3.5 megahertz transducer may be focussed at distances ranging from 2.0 centimeters to 12.5 centimeters (referenced from the probe exit membrane) with its frequency spectrum changing in a corresponding manner from 5 megahertz to 2.4 megahertz. Similarly, the nominal 5 megahertz transducer can be focussed at distances ranging from 2 to 12 centimeters with its frequency spectrum shifting from 5 megahertz to approximately 3.3 megahertz. The trigger signal for the 5 megahertz transducer is a single pulse for the near field focal zones, in order to provide a broad band frequency spectrum for good resolution. Data values for these 16 different combinations of focal distance and frequency may easily be stored in PROM's 140 and 142, which, as discussed above, can store up to 64 such combinations for transducers having up to six elements.

TABLE I

| 3.5 MHz Tranducer | | 5 MHz Transducer | |
| --- | --- | --- | --- |
| Depth, cm. | Freq., MHz. | Depth, cm. | Freq., MHz |
| 2.0 | 5 | 2 | Broad band, single pulse |
| 3.0 | ↑ | 3 | Broad band, single pulse |
| 4.0 | ↑ | 4.0 | Broad band, single pulse |
| 5.0 | ↑ | 5.0 | Broad band, single pulse |
| 6.5 | ↓ | 6.5 | 5.0, double pulse |
| 8.5 | ↓ | 8.0 | ↑, double pulse |
| 10.5 | ↓ | 10.0 | ↓, double pulse |
| 12.5 | 2.5 | 12.0 | 3.3, double pulse |

What is claimed is:

1. In an ultrasonic diagnostic imaging system, including an annular array transducer of concentric piezoelectric elements for transmitting ultrasonic energy into tissue to be imaged and for receiving echoes from said tissue; apparatus comprising:

a plurality of transducer pulsers, each having an output coupled to a respective element of said transducer for exciting said elements, and having respective inputs; and means, coupled to said inputs of said pulsers, for selecting from a plurality of predetermined activating signals, a time sequence of activating signals for a single transmit period which focuses the energy transmitted by ones of said elements at a given tissue depth, said selected signals exhibiting one of a plurality of predetermined characteristic waveforms for exciting said elements at one of a plurality of transmission frequencies, which frequency is variable as a function of said tissue depth, wherein said selected activating signals are applied to respective ones of said pulser inputs.

2. In an ultrasonic diagnostic imaging system, including an annular array transducer of concentric piezoelectric elements for transmitting ultrasonic energy into tissue to be imaged and for receiving echoes from said tissue; apparatus comprising:

memory means for storing transmit control signals corresponding to a plurality of different focal depths and corresponding transmission frequencies; and means, having an input coupled to said memory means and outputs coupled to respective ones of said elements of said transducer, and responsive to said transmit control signals for exciting said elements in one of a plurality of time sequences which focuses energy transmitted by said elements at a given one of said focal depths, and for exciting said elements with one of a plurality of predetermined waveforms to transmit energy at the frequency corresponding to said given focal depth.

3. In an ultrasonic diagnostic imaging system, including an annular array transducer of concentric piezoelectric elements for transmitting ultrasonic energy into tissue to be imaged and for receiving echoes from said tissue; apparatus comprising:

a plurality of transducer pulsers, each having an output coupled to a respective element of said transducer for exciting said elements, and having respective inputs;

means, coupled to said inputs of said pulsers, for selectively activating said pulsers in one of a plurality of time sequences so as to focus the energy transmitted by said elements at a given tissue depth;

control means, coupled to said selectively activating means, for selecting said one time sequence corresponding to said given tissue depth; and means, coupled to said control means and to said inputs of said pulsers, and responsive to the selection of said one time sequence, for exciting said elements at one of a plurality of transmission frequencies corresponding to said given tissue depth.

4. In an ultrasonic diagnostic imaging system, including an annular array transducer of concentric piezoelectric elements for transmitting ultrasonic energy into tissue to be imaged and for receiving echoes from said tissue; apparatus comprising:

a plurality of transducer pulsers, each having an output coupled to a respective element of said transducer for exciting said elements, and having respective inputs;

means, coupled to the inputs of said pulsers, for activating said pulsers in one of a plurality of time sequences corresponding to different tissue focal depths, and for exciting said elements at one of a variety of different transmission center frequencies; and selection means, coupled to said means for activating and exciting, for selecting one of said time sequences and a corresponding transmission center frequency;

wherein the transmission center frequency at the maximum tissue focal depth is lower than the transmission center frequency at the minimum tissue focal depth.

5. In an ultrasonic diagnostic imaging system, including an annular array transducer of concentric piezoelectric elements for transmitting ultrasonic energy into tissue to be imaged and for receiving echoes from said tissue; apparatus comprising:

a memory for storing blocks of data, each block including a plurality of data streams and each data stream comprising a sequence of one or more pulses which may be read from the memory in a given time relationship to the other data streams in the same data block;

means for selecting a given depth of focus in said tissue to be imaged over a range of focal depths;

a central processing unit, coupled to said selecting means, for addressing a given one of said data blocks of said memory;

means for simultaneously reading out said data streams of said addressed data block; and a plurality of transducer pulsers, each having an input coupled to receive a respective one of said data streams of said addressed data block, and respective outputs coupled to respective ones of said elements of said transducer, for focussing said transducer in accordance with the time relationship of said pulses and for exciting said elements into ultrasonic transmission at a selected frequency of a plurality of frequencies determined by the repetition rate of said pulses in said data streams, wherein different depths of focus have different corresponding transmission frequencies.

6. The arrangement of claim 5, wherein said pulsers each include a power FET for driving a transducer element.

7. In an ultrasonic diagnostic system, including a multi-element transducer for transmitting ultrasonic energy into tissue to be imaged and for receiving echoes from said tissue; apparatus comprising:

a memory for storing blocks of data, each block including a plurality of data streams and each data stream comprising a sequence of one or more pulses which may be read from the memory in a given time relationship to the other data streams in the same data block;

means for selecting a given depth of focus in said tissue to be imaged over a range of focal depths;

a central processing unit, coupled to said selecting means, for addressing a given one of said data blocks of said memory;

means for simultaneously reading out said data streams of said addressed data block; and a plurality of transducer pulsers, each having an input coupled to receive a respective one of said data streams of said addressed data block, and respective outputs coupled to respective ones of said elements of said transducer, for focussing said transducer in accordance with the time relationship of said pulses and for exciting said elements into ultrasonic transmission at frequencies determined by the repetition rate of said pulses in respective ones of said data streams, wherein different depths of focus have different transmission frequencies; said pulsers each include a power FET for driving a transducer element; and wherein said memory includes first and second PROM's having outputs coupled to a multiplexer for alternately producing data from said PROM's at the outputs of said multiplexer, wherein the data streams produced by said multiplexeer exhibit a bandwidth which is twice the bandwidth of data streams produced by said respective PROM's.

8. In an ultrasonic diagnostic imaging system, including a multi-element transducer for transmitting ultrasonic energy into tissue to be imaged and for receiving echoes from said tissue; apparatus comprising:

a memory for storing blocks of data, each block including a plurality of data streams and each data stream comprising a sequence of one or more pulses which may be read from the memory in a given time relationship to the other data streams in the same data block;

means for selecting a given depth of focus in said tissue to be imaged over a range of focal depths;

a central processing unit, coupled to said selecting means, for addressing a given one of said data blocks of said memory;

means for simultaneously reading out said data streams of said addressed data block; and a plurality of transducer pulsers, each having an input coupled to receive a respective one of said data streams of said addressed data block, and respective outputs coupled to respective ones of said elements of said transducer, for focussing said transducer in accordance with the time relationship of said pulses and for exciting said elements into ultrasonic transmission at frequencies determined by the repetition rate of said pulses in respective ones of said data streams, wherein different depths of focus have different transmission frequencies; said pulsers each include a power FET for driving a transducer element; and wherein said memory includes first and second PROM's having outputs coupled to a multiplexer for alternately producing data from said PROM's at the outputs of said multiplexer, wherein the data streams produced by said multiplexer exhibit a bandwidth which is twice the bandwidth of data streams produced by said respective PROM's; and further comprising:

a first source of clock signals at a first frequency;

a second source of clock signals at a frequency which is half said first frequency;

means for applying said second clock signals to said PROM's and said multiplexer;

a latch stage having outputs, and inputs coupled to the outputs of said multiplexer;

means for applying said first clock signals to said latch stage; and means for coupling the outputs of said latch stage to the inputs of said pulsers.

9. In an ultrasonic diagnostic imaging system, including a multi-element transducer for transmitting ultrasonic energy into tissue to be imaged and for receiving echoes from said tissue; apparatus comprising:

a plurality of transducer pulsers, each having an output coupled to a respective element of said transducer for exciting said elements, and having respective inputs;

means for selecting a given depth of focus within said tissue to be imaged from a range of focal depths by controlling the time sequence of pulsing of the respective elements; and means, responsive to said selecting means, for activating said pulsers to produce broad band ultrasonic energy transmission by said transducer elements when one depth of focus is selected, and to produce narrow band ultrasonic energy transmission by said transducer elements when a different depth of focus is selected.

10. The arrangement of claim 9, wherein the spectrum of said narrow band energy transmission is centered around one of a plurality of different center frequencies.

11. The arrangement of claim 10, wherein said activating means applies a single pulse to respective ones of said pulsers when near field focusing is selected, and a plurality of pulses to respective ones of said pulsers when far field focusing is selected.

12. The arrangement of claim 11, wherein said center frequencies are determined as a function of the periodicity of said plurality of pulses.

13. In an ultrasonic diagnostic imaging system, including an annular array transducer of concentric piezoelectric elements for transmitting ultrasonic energy into tissue to be imaged and for receiving echoes from said tissue; apparatus comprising:

means for selecting a given depth of transmit focus from a range of focal depths;

means, responsive to said selection of said given depth, and coupled to said elements of said transducer, for activating said elements in one of a plurality of time sequences so as to focus said transmitted energy at said selected depth;

means, responsive to said selection of said given depth, and coupled to said elements of said transducer, for causing said transmitted energy to exhibit one of a plurality of respectively different frequency characteristics which are variable as a function of the depth of transmit focus; and means, coupled to said transducer elements, for dynamically focusing the received echo information.

* * * * *